United States Patent

Searing et al.

[11] Patent Number: 5,403,050
[45] Date of Patent: Apr. 4, 1995

[54] CANINE WASTE APPARATUS AND DISPOSABLE BAG THEREFOR

[75] Inventors: John Searing, West Caldwell, N.J.; Robert Riceman, New Lisbon, N.Y.; Mitchell Medina, Essex Fells, N.J.

[73] Assignee: Randolph-Rand Corporation, New York, N.Y.

[21] Appl. No.: 76,857

[22] Filed: Jun. 14, 1993

[51] Int. Cl.⁶ .......................................... A01K 29/00
[52] U.S. Cl. ................................................. 294/1.5
[58] Field of Search ........................... 294/1.3–1.5, 294/19.1, 55, 115; 15/257.1, 257.6; 119/161, 168; 47/63, 95, 102, 105

[56] References Cited

U.S. PATENT DOCUMENTS

| | | | |
|---|---|---|---|
| 3,937,509 | 2/1976 | Hufnagel | 15/257.6 X |
| 4,010,970 | 3/1977 | Campbell | 294/1.5 |
| 4,156,400 | 5/1979 | Migdal | 294/1.3 X |
| 4,335,678 | 6/1982 | Garza et al. | 294/1.5 |
| 4,363,508 | 12/1982 | Duke | 294/1.5 |
| 4,878,703 | 11/1989 | Yoshioka | 294/1.5 |
| 5,056,842 | 10/1991 | Lindenberg et al. | 294/115 X |
| 5,178,426 | 1/1993 | David et al. | 294/1.3 |

FOREIGN PATENT DOCUMENTS

| | | | |
|---|---|---|---|
| 2660524 | 10/1991 | France | 294/1.5 |
| 2804553 | 8/1979 | Germany | 294/1.5 |
| 7713350 | 9/1979 | Netherlands | 294/1.5 |

*Primary Examiner*—Dean J. Kramer
*Attorney, Agent, or Firm*—Siegmar Silber

[57] ABSTRACT

A sanitary device for collecting and disposing of canine fecal matter is disclosed. The device uses a scooper device with a disposable bag which is formed from a bag blank. The bag blank has a collection portion on the upper surface, and a closure device for closing a bag formed therefrom. The closure device is attached to the periphery of the lower surface. During use the scooper device maintains the collection portion of the bag blank in a substantially flat condition. The bag blank, upon mounting for use, substantially covers and protects from soilage the scooper device. After canine feces is collected on the surface of the bag blank; the bag is formed by operating the scooper device; and, then is securely closed to form a disposable bag.

23 Claims, 2 Drawing Sheets

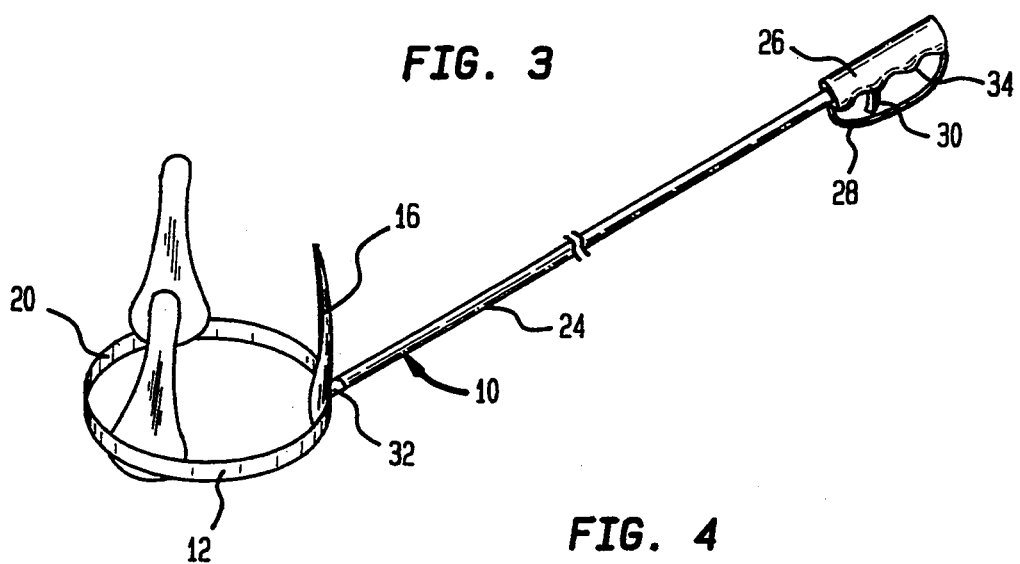
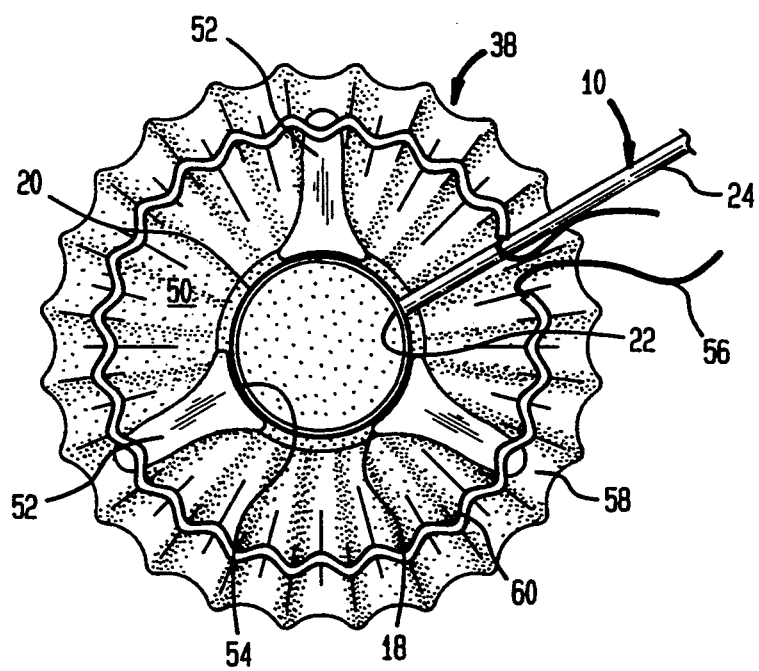
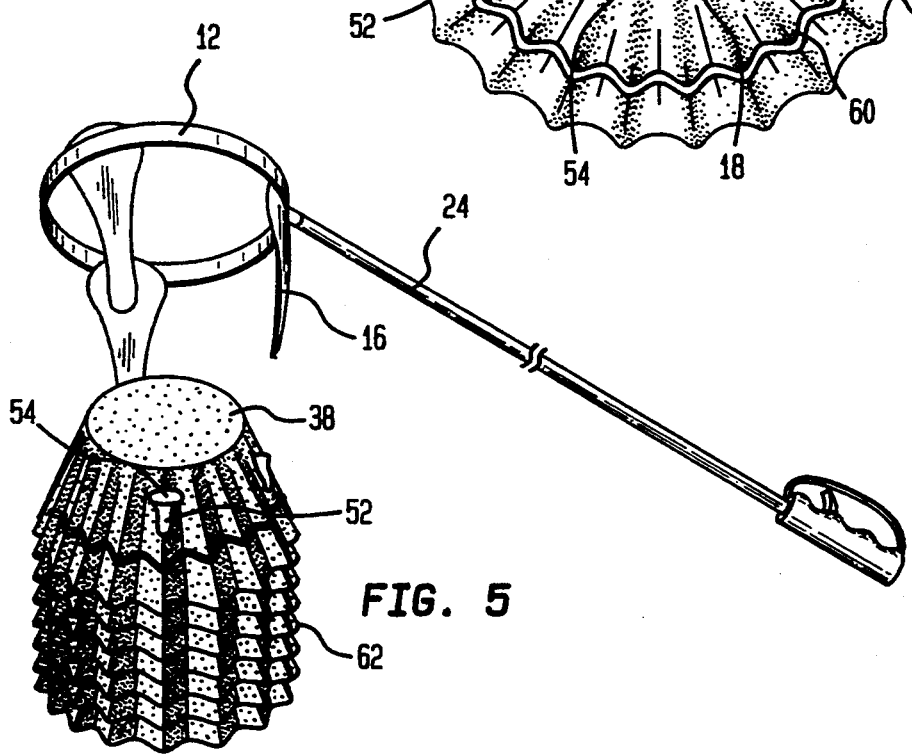

CANINE WASTE APPARATUS AND DISPOSABLE BAG THEREFOR

BACKGROUND OF THE INVENTION

1. Field of the Invention

This invention relates to a device to aid dog owners in the collection, handling and disposal of canine fecal matter, and, more particularly, to a waste disposal apparatus and a disposable bag for use in conjunction therewith. In the disposal apparatus disclosed, the bag is formed from a blank which is manipulated during use to a partially closed position.

2. Information Disclosure Statement

Numerous municipal corporations have enacted ordinances to safeguard residents from the health hazards and nuisances stemming from uncollected canine fecal matter. As such fecal material is capable of transmitting diseases, the ordinances have generally been upheld as being within the police power of the municipalities. More commonly, the press has referred to these provisions as "pooper scooper" laws and various devices ranging from specially designed shovels to elaborate gloves have been devised to aid the dog owner in the discharge of his responsibility. As will be seen in the brief background discussion which follows, the devices entail numerous technical and sanitary considerations.

The inventor is familiar with some technological developments found in the following field:

| CLASS/SUBCLASS |
|---|
| 294/49, 1.3, 1.5 |

From the above field the following patents are known to the inventor hereof:

| ITEM NO. | U.S. Pat. No. | INVENTOR | ISSUE DATE |
|---|---|---|---|
| 1. | 3,744,453 | G. Deitch | 07/10/73 |
| 2. | 3,777,708 | K. J. Vogt | 12/11/73 |
| 3. | 3,786,780 | C. Pezzino | 01/22/74 |
| 4. | 4,003,595 | Fano et al. | 01/18/77 |
| 5. | 4,768,818 | D. S. Kolic | 09/06/88 |
| 6. | 4,896,912 | V. A. Parnell | 01/30/90 |
| 7. | 4,900,077 | W. R. Beck | 02/13/90 |
| Foreign | | | |
| DE 3807221 A1 (Germany) | | M. Bock | 03/05/88 |
| DE 3809286 A1 (Germany) | | M. Bock | 03/19/88 |

In considering the various patents known, it is noted that these devices are generally descriptive of disposable bags or pouches and devices for manipulating such bags, which may include a bag opening and closing mechanisms. Many of the bags are also provided with drawstrings or other closure arrangements.

U.S. Pat. No. 3,744,453 to G. Deitch—Issued Jul. 10, 1973

Discloses a sanitary waste receiver and guide rod whereby canine droppings may be received and disposed of using a disposable pouch.

U.S. Pat. No. 3,777,708 to K. J. Vogt—Issued Dec. 11, 1973

Discloses a canine feces disposal mechanism having a retractable steel band which fits within a disposal bag having a folded pocket in the top portion thereof for receiving canine feces.

U.S. Pat. No. 3,786,780 to C. Pezzino—Issued Jan. 22, 1974

Discloses a portable canine toilet having in combination a holder and a disposable waste receiving means.

U.S. Pat. No. 4,003,595 to Fano et al.—Issued Jan. 18, 1977

Discloses a device similar to Vogt '708 supra, but further includes a locking slide and hook arrangement.

U.S. Pat. No. 4,768,818 to D. S. Kolic—Issued Sep. 6, 1988

Discloses a pliant, disposable mitt with a manipulable pocket for fully enclosing the fecal waste within the pocket.

U.S. Pat. No. 4,896,912 to V. A. Parnell—Jan. 30, 1990

Discloses a scooper covered by an invertable bag which receives fecal waste on one side and, upon inversion, packages the waste.

U.S. Pat. No. 4,900,077 to W. R. Beck—Feb. 13, 1990

Discloses a telescoping bag frame which has three protuberances over which the bag may be stretched for receiving fecal waste.

Germany DE3807221 A1 and DE 3809286 A1 to M. Bock—Mar. 5, 1988 and Mar. 19, 1988. Respectively Disclose a dog excrement receiver mounted on the end of an extension rod to maintain the collection of canine fecal matter at arm's length from the dog owner. Bock '221 shows a catchment device and Bock '286 shows a catchment device with a handle-operated bag closure.

No patent or combination thereof shows a dog excrement catcher with a disposable bag, a drawstring or other closure, and a holder having a mechanism which forms the disposable bag from a bag blank. Also, as will be seen from the disclosure which follows, the bag blank is mounted to protect the mechanism and drawstring or other closure from being soiled. During operation, the mechanism holds the bag blank in a substantially flat position.

SUMMARY

In general terms, the invention disclosed hereby is a canine fecal matter collection and disposal apparatus. In the mode of the invention, a bag frame is attached to one end of a handle, and the handle has a handgrip at the other end. An actuating rod extends from the frame to the handgrip and connects, adjacent to the handgrip, to a trigger mechanism. By squeezing the trigger mechanism, the frame is actuatable from a substantially flat or open position to a substantially erect or partially closed position. A bag blank for a disposable bag is provided that is adapted to mount onto the frame and has a closure means thereon. In the within invention, the closure means is a drawstring. In operation, a bag blank for a disposable bag is mounted on the frame and protects the frame from being soiled by canine fecal matter. In the open position, the device is operated so that the bag blank is substantially flat. The opened device is then used to catch the fecal matter falling from a dog. With the excrement on the flattened bag blank the actuator is released enclosing the waste in a partially closed bag. The operator completes the closure of the disposable pouch by drawing the drawstring closed, or in the case of another closure device completing the closure thereof, and pulls the disposable pouch off the frame. Because this mechanical closure is on the underside of the bag during the catchment phase, the procedure is one of enhanced sanitation which minimizes possible contact by the operator with canine fecal matter. The closed pouch is then discarded and an empty pouch is placed on the frame.

OBJECT AND FEATURES OF THE INVENTION

It is an object of the present invention to provide an economical device for collection and disposal of canine fecal matter.

It is a further object of the present invention to provide a device having a disposable bag portion which, in operation, is arrayed in a manner which promotes sanitary handling.

It is yet another object of the present invention to provide a device which minimizes equipment cleaning after use.

It is still yet another object of the present invention to provide a secured disposal container which container is biodegradable.

It is a feature of the present invention that the apparatus forms a disposable bag from a bag blank.

It is another feature of the present invention that the disposable bag is operable by the holding device portion between a flat, substantially open and a partially closed position.

It is another feature of the present invention to have a drawstring or closure means facilitating the removal of the used bag from the frame and completing the closure of the partially closed bag.

It is yet another feature of the present invention to have a bag which when mounted on the holding device protects the holding device from becoming soiled by canine fecal matter.

Other objects and features of the invention will become apparent upon review of the drawings and the detailed description which follow.

BRIEF DESCRIPTION OF THE DRAWINGS

In the following drawings, the same parts in the various views are afforded the same reference designators.

FIG. 3 is a perspective view of the invention shown in FIG. 2, but shown for illustrative purposes with the disposable bag removed;

FIG. 4 is a bottom plan view of the disposable bag showing the pockets and drawstring thereof; and, FIG. 5 is a perspective view of an inverted stack of disposable bags with the topmost bag being loaded onto the frame device.

DESCRIPTION OF THE PREFERRED EMBODIMENT

The apparatus described hereinbelow is one which follows closely canine behavior and provides a distinct improvement in sanitary collection and disposal of canine fetal matter. The apparatus includes two basic units—the frame device and the bag blank for the disposable bag. It has been observed that a dog generally stops in a single location for defecation and that sliding a flat collection device underneath will not disturb this function. In the case at hand and in the best mode of practicing the invention, the frame device has an array of fingers upon which the disposable bag is emplaced. It is understood that alternate frame devices for bag forming can be envisioned without departing from the spirit of this invention. Many of the prior art devices have frame portions which are left uncovered by the bag placement or which expose the dog owner to hazards during handling of canine fecal matter.

Figure 1:
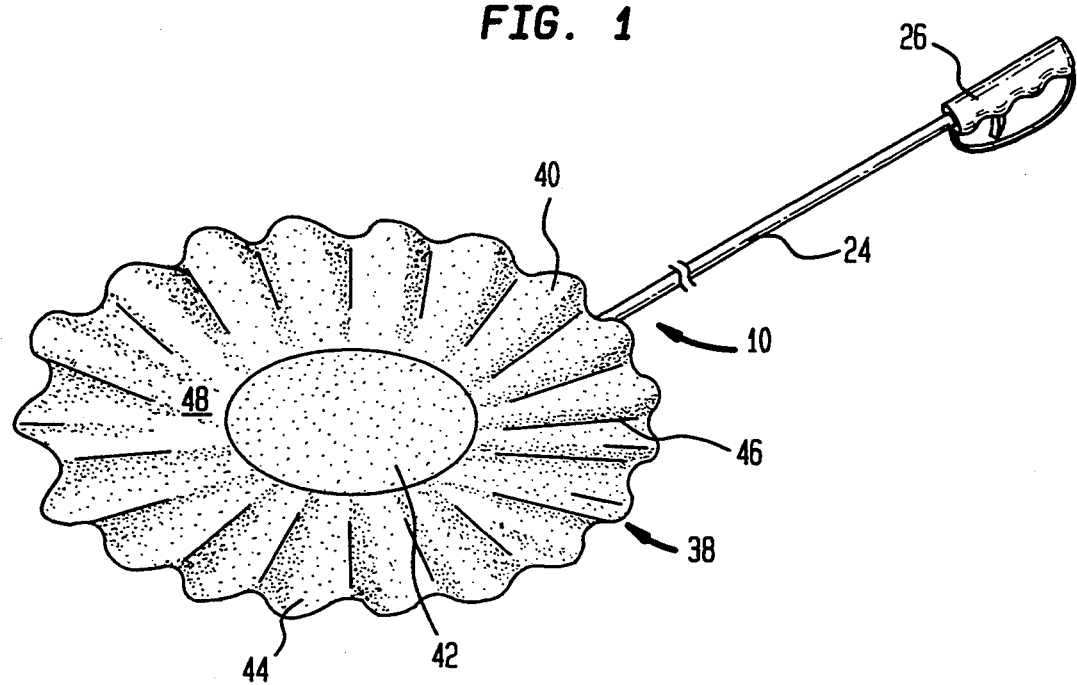
FIG. 1 is a perspective view of the canine waste apparatus and disposable bag therefor of the present invention, said apparatus shown in the open position.
Figure 2:
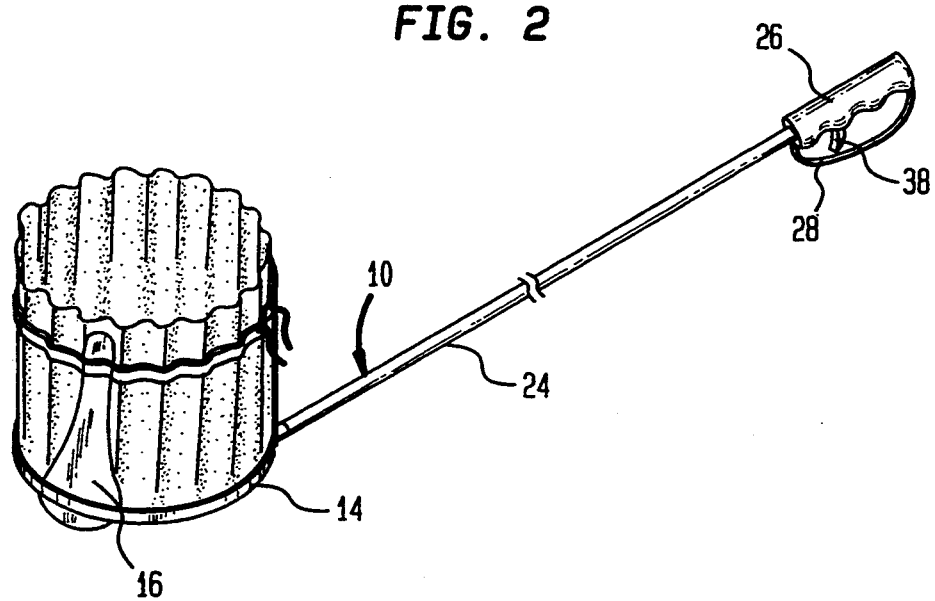
FIG. 2 is a perspective view of the invention shown in FIG. 1, but shown with the apparatus in the closed position.

Referring now to FIGS. 1 through 4, the frame device and disposable bag are shown and the sanitary device for collecting and disposing of canine fecal matter is referred to by the numeral 10. The frame device 12 is constructed with a base 14 which base is a substantially planar body. To the base, a number of finger-like elongated members 16 are hingedly attached at one end thereof at hinge 18. While finger-like elements cooperating with pockets are taught hereby, any of numerous means can be used to attach the bag blank to the frame device, including inter alia adhesive strips (such as is used for personal hygiene products for lining clothing); catchment devices that pinch part of the blank without penetrating the same; and, extra folds rather that form an origami-like drape around the frame device. The finger-like attachments 16 are constructed to be operable from an open position wherein which the fingers are substantially coplanar with the base 14 to a closed position wherein which the fingers are normal or within 15 degrees of normal to the base. While any number of finger-like projections may be used, typically three or four are chosen. Also, while many different arrangements can be employed to swing the fingers from one position to the other and back again, in the best mode, a retractable and extendable guide 20 is shown. However, it is intended that the descriptive language hereof, to wit, "guide means", apply equally to a cam-operated mechanism which would be configured differently, but function similarly. In the invention at hand, the extendable guide 20 is attached to each elongated member 16 proximate to the hinge 18 at guide aperture 22. When extended the guide 20 is substantially concentric to or encircling the base 14. When retracted the guide 20 is substantially coaxial with base 14. A shaft 24 extends from the base 14 and guides 20 and at the free end a handgrip 26 is mounted thereupon. A trigger or actuator mechanism 28 is constructed with a trigger 30 attached to the shaft 24 and adjacent the handgrip 26. A control rod or actuator linkage 32 is cooperatively functional with the trigger 30 and guide 20 and enables the retraction and extension of the guide 20. A detent or lock 34 latches the actuator 32 in the retracted position, and, upon release, the spring return [not shown] urges the actuator 32 to the extended or open position. Mechanically, it would be obvious to provide a mechanism the reverse of that just described and have the spring return urge the actuator to the retracted or closed position.

The disposable bag or pouch 38 of the device is next discussed. The bag 38 is formed from a web or blank 40 of one or more layers of a biodegradable paper or fibrous material and can be either a woven or non-woven product. The central portion 42 of the blank 40 is dimensioned to coincide with base 14 of frame device 12. The outer portion 44 is adjacent central portion 42 and is prefolded to form pleats or gussets 46 upon the frame device 12 being operated to the closed position. Although in the best mode, the bag blank 40 is used with a bag forming device, the disposable bag 38 is also useable with a flat ring-like holder. The blank 40 has an upper surface 48 which, upon the frame device 12 being operated to the closed position, forms the inner wall of the disposable bag. Further, the blank 40 has a lower surface 50 which, upon the frame device being operated to the closed position, forms the outer wall of the disposable bag. Consistent with the number of finger-like elongated members 16 of the frame device 12, a plurality of pockets 52 are attached to the lower surface 50 of the web or blank 40 in a manner radiating outward from the central portion 42. Each pocket 52 has an opening 54 adjacent the central portion. While the pockets of the best mode are shaped similar to the shape of the elongated members 16, any of a number of shapes could be adopted that would function satisfactorily. Further, a closure device or drawstring 56 is attached to the peripheral margin 58 of the lower surface 50. The drawstring 56 is retained within a drawstring holder 60 attached to the peripheral margin 58.

In operation, the disposable bag 38 is first assembled to the frame device 12. Referring now to FIG. 5, an inverted stack 62 of disposable bags 38 is shown. The stack 62 permits entry of the fingers 16 of a closed frame device 12 into pockets 52 of the topmost bag. With the fingers 16 inserted and base 12 resting atop central portion 42 of the lower surface 50, the trigger 30 is squeezed permitting the extension of guide 20 and the actuation of the frame device 12 to the open position. This "picks off" the uppermost bag 38 from stack 62. Next canine fecal matter is collected on the upper surface 48 and the trigger 30 is again operated, retracting guide 20 and moving the fingers 16 to the closed position. At this point, the disposable bag 38 is partially closed and is formed into a cup-like vessel. The closure of the disposable bag 38 is completed by removing the used bag 38 from the frame device 12 and tying off the opening thereof using drawstring 56. It is noted that throughout the operation of the device, fecal matter only touches the upper surface 48 and no fecal matter is in contact with the frame device 12. Similarly, the operator touches only the drawstring 56 which is mounted away from the canine activity by being mounted on lower surface 50. By maintaining strict separation, sanitary handling is achieved and device clean up is minimized. Further, an environmentally sound practice of using a biodegradable material for packaging canine waste is utilized.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A sanitary system for collecting canine fecal matter during defecation by a dog and for subsequent sanitary disposal thereof comprising, in combination:

bag blank means for forming a disposable bag having a web with an upper surface and a lower surface, said bag blank means further comprising;

a central deposition portion on the upper surface thereof for collecting canine fecal matter during defecation by the dog;

closure means for closing a bag formed therefrom, said closure means attached to the periphery thereof;

a receiving device for receiving said bag blank means, said receiving device disposed to maintain, during collection of canine fecal matter, said central deposition portion of said bag blank means disposed substantially horizontally in a single plane and, during disposal, operable to form a disposable bag about said fecal matter; and, said bag blank means, upon mounting for use, substantially covering and protecting from soilage said receiving device;

whereby said sanitary system is, during disposal, operable to close said disposable bag.

2. A sanitary system for collecting matter during defecation by a dog and for subsequent sanitary disposal thereof comprising, in combination:

bag blank means for forming a disposable bag having a web with an upper surface and a lower surface, said bag blank means further comprising;

a collection portion on the upper surface thereof;

closure means for closing a bag formed therefrom, said closure means attached to the periphery thereof;

a receiving device for receiving said bag blank means, said receiving device disposed to maintain, during collection of canine fecal matter said collection portion of said bag blank means disposed substantially horizontally in a single plane and, during disposal operable to form a disposable bag about said fecal matter, said receiving device further comprising;

a bag-forming frame positionable between an open position and a closed position with, in the open position, said bag-forming frame substantially co-planar with said receiving device and, in the closed position, said bag-forming frame at an angle to said receiving device;

guide means for positioning said bag-forming frame, said guide means attached to said bag-forming frame and movable to guide the bag-forming frame from said closed position to said open position and, conversely, to guide the bag-forming frame from said open position to said closed position; and, said bag blank means, upon mounting for use, substantially covering and protecting from soilage said receiving device;

whereby said sanitary system is, during disposal, operable to close said disposable bag.

3. A sanitary system for collecting and disposing of canine fecal matter as described in claim 2, wherein said bag-forming frame and said guide means further comprise:

at least three elongated members, each hingedly attached at one end thereof to said receiving device and positionable between an open position wherein the elongated members are held substantially co-planar with said collection portion and a closed position wherein the elongated members are held at an angle to said collection portion; and, said guide means for positioning said elongated members attached to each elongated member proximate to the hingedly attached end thereof, said guide means movable to guide elongated members from said closed position to said open position and, conversely, to guide the elongated members from said open position to said closed position.

4. A sanitary system for collecting and disposing of canine fecal matter as described in claim 3 wherein said guide means is extendable to guide the elongated members from said closed position to said open position and, conversely, is retractable to guide the elongated members from said open position to said closed position; and said sanitary system further comprises:

a handgrip;

a shaft attached at one end thereof to the handgrip and at the other to said bag-forming frame, said shaft enclosing a portion of said guide means therewithin; and, an actuator mounted adjacent said handgrip, said actuator in cooperative functional relationship with said guide means and operable to extend and retract said guide means.

5. A sanitary system for collecting and disposing of canine fecal matter as described in claim 4, wherein said actuator further comprises: a trigger mechanism; and, a control rod attached to said guide means and said trigger, said control rod functioning to extend and retract said guide means relative to said shaft.

6. A sanitary system for collecting and disposing of canine fecal matter as described in claim 3 wherein said bag blank further comprises:

a plurality of pockets attached to the lower surface of said bag blank, each said pocket arrayed to radiate outwardly from the central portion of said blank and dimensioned to receive one of said elongated members.

7. A sanitary system for collecting and disposing of canine fecal matter as described in claim 6 wherein said closure means is attached to the periphery of the lower surface of said web.

8. A sanitary system for collecting and disposing of canine fecal matter as described in claim 7 wherein said closure means is a drawstring.

9. A sanitary system for collecting and disposing of canine fecal matter as described in claim 8, wherein each of said plurality of pockets has an opening adjacent the central portion which is substantially wider than the elongated fingers so as to facilitate insertion thereof.

10. A sanitary system for collecting and disposing of canine fecal matter as described in claim 8, wherein said bag blank is constructed from a biodegradable material.

11. A sanitary device for collecting and disposing of canine fecal matter, said device used in connection with a disposable bag formed from a bag blank having an upper and a lower surface and a collection portion on the upper surface thereof, said device comprising:

a receiving device for receiving said bag blank, said receiving device disposed to maintain said collection portion of said bag blank substantially planar, said receiving device further comprising;

a bag-forming frame positionable between an open position substantially co-planar with said collection portion and a closed position with the bag-forming frame at an angle to said collection portion; and, guide means for positioning said bag-forming frame, said guide means attached to said bag-forming frame and movable to guide the bag-forming frame from said closed position to said open position and, conversely, to guide the bag-forming frame from said open position to said closed position;

whereby, upon placing a bag blank on and about said bag-forming frame and said receiving device, said bag-forming frame is operated to an open, substantially planar position; canine feces is collected on the surface of said bag blank; and, then, a bag is formed by operating the bag-forming frame to a closed position.

12. A sanitary device for collecting and disposing of canine fecal matter as described in claim 11, wherein said bag-forming frame and said guide means further comprise:

at least three elongated members, each hingedly attached at one end thereof to said receiving device and positionable between an open position wherein the elongated members are held substantially co-planar with said collection portion and a closed position wherein the elongated members are held at an angle to said collection portion; and, said guide means for positioning said elongated members attached to each elongated member proximate to the hingedly attached end thereof, said guide means movable to guide elongated members from said closed position to said open position and, conversely, to guide the elongated members from said open position to said closed position.

13. A sanitary device for collecting and disposing of canine fecal matter as described in claim 12 wherein said guide means is extendable to guide the elongated members from said closed position to said open position and, conversely, is retractable to guide the elongated members from said open position to said closed position; and said sanitary device further comprises:

a handgrip;

a shaft attached at one end thereof to the handgrip and at the other to said receiving device, said shaft enclosing a portion of said guide means therewithin; and, an actuator mounted adjacent said handgrip, said actuator in cooperative functional relationship with said guide means and operable to extend and retract said guide means.

14. A sanitary device for collecting and disposing of canine fecal matter as described in claim 13, wherein said actuator further comprises:

a trigger mechanism; and, a control rod attached to said guide means and said trigger, said control rod functioning to extend and retract said guide means relative to said shaft.

15. A sanitary system for collecting and disposing of canine fecal matter as described in claim 11 wherein, when used with said disposable bag formed from said bag blank, said receiving device, said bag-forming frame and said guide means are substantially covered and protected from soilage.

16. A sanitary system for collecting canine fecal matter during defecation by a dog and for subsequent sanitary disposal thereof, said sanitary system including a bag blank mountable on a receiving device and a bag-forming frame, said bag-forming frame operable between an open and a closed position, said bag blank comprising:

a web having an upper and a lower surface, said web, in turn, further comprising:

a central deposition portion;

an outer portion adjacent to the central deposition portion, said outer portion being prefolded to provide a cup-like vessel when the web is mounted on said bag-forming frame and said bag-forming frame is in the closed position; and, closure means attached to the periphery of said web for closing said cup-like vessel upon removal from the bag-forming frame;

said bag-forming frame, upon having said bag blank placed on said receiving device and about said bag-forming frame, operable to dispose said web in a substantially planar and substantially horizontal position, used during defecation of the dog for receiving canine feces on the surface of said web and said bag-forming frame then operable to a closed position.

17. A sanitary system for collecting and disposing of canine fecal matter as described in claim 16 wherein said bag blank, upon mounting for use, substantially covers and protects from soilage said receiving device and said bag-forming frame.

18. A sanitary system for collecting and disposing of canine fecal matter as described in claim 16, wherein said bag-forming frame further comprises:

at least three elongated members each hingedly attached at one end thereof to said receiving device and positionable between an open position wherein the elongated members are held substantially co-planar with said collection portion and a closed position wherein the elongated members are held substantially normal to said collection portion.

19. A sanitary system for collecting and disposing of canine fecal matter as described in claim 16 wherein said closure means is attached to the periphery of the lower surface of said web.

20. A sanitary system for collecting and disposing of canine fecal matter, said sanitary system including a bag blank mountable on a receiving device and a bag-forming frame, said bag-forming frame operable between an open and a closed position, said bag blank comprising:

a web having an upper and a lower surface, said web, in turn, further comprising:

a central portion;

an outer portion adjacent to the central portion, said outer portion being prefolded to provide a cup-like vessel when the web is mounted on said bag-forming frame and said bag-forming frame device is in the closed position; and, closure means attached to the periphery of said web for closing said cup-like vessel upon removal from said bag-forming frame; said bag-forming frame, in turn, comprises:

at least three elongated members, each hingedly attached at one end thereof to said receiving device and positionable between an open position wherein the elongated members are held substantially co-planar with said collection portion and a closed position wherein the elongated members are held substantially normal to said collection portion;

whereby, upon placing said bag blank on said receiving device and about said bag-forming frame; the sanitary device is operated to an open, substantially planar position; used for collection of canine feces on the surface of said bag blank; and, is then operated to a closed position.

21. A sanitary system for collecting and disposing of canine fecal matter as described in claim 20 wherein said bag blank further comprises:

a web having an upper and a lower surface; and, a plurality of pockets attached to the lower surface of said web, each said pocket arrayed to radiate outwardly from the central portion of said blank and dimensioned to receive a separate one of said elongated members.

22. A sanitary system for collecting and disposing of canine fecal matter as described in claim 21 wherein said bag blank, upon mounting for use, substantially covers and protects from soilage said receiving device and said bag-forming frame.

23. A sanitary system for collecting and disposing of canine fecal matter as described in claim 20 wherein said closure means is attached to the periphery of the lower surface of said web.

* * * * *